July 25, 1944. A. COX 2,354,503
OPTICAL OBJECTIVE OF THE TELEPHOTO TYPE
Filed Dec. 12, 1942
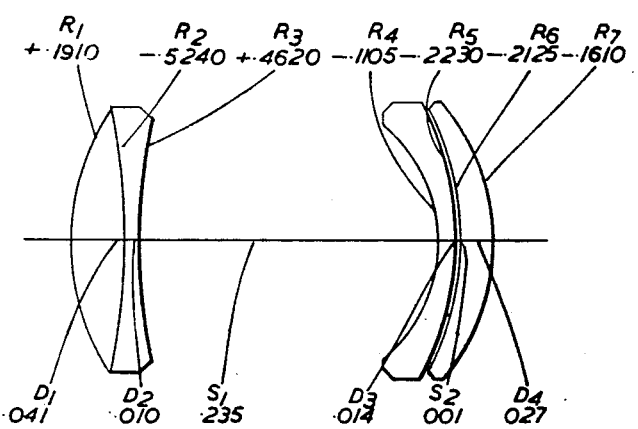
Inventor
A. Cox.

Patented July 25, 1944

2,354,503

UNITED STATES PATENT OFFICE 2,354,503

OPTICAL OBJECTIVE OF THE TELEPHOTO TYPE

Arthur Cox, Leicester, England, assignor to Taylor, Taylor & Hobson Limited, Leicester, England, a company of Great Britain Application December 12, 1942, Serial No. 468,839 In Great Britain December 1, 1941

9 Claims. (Cl. 88—57)

This invention relates to optical objectives of the telephoto type corrected for spherical and chromatic aberrations, coma, astigmatism and field curvature, and comprising a front convergent member separated by a considerable air space (say between .15 and .35 of the equivalent focal length of the objective, from the rear divergent member. It is to be understood that the terms "front" and "rear" as herein used relate to the sides of the objective respectively nearer to and further from the longer conjugate in accordance with the usual convention.

The primary object of the invention is to provide even illumination over a large field in order to improve vignetting. This is usually accomplished in objectives by providing a large clear back aperture, but in telephoto objectives difficulties have arisen in increasing the clear back aperture beyond, say, three-quarters of the clear front aperture, so that the desired improvement in vignetting has only been obtainable at the expense of introducing serious oblique aberrations. The present invention enables these difficulties to be satisfactorily overcome.

The objective according to the invention comprises two doublet members, the mean refractive indices of the four glass elements of which are all greater than 1.610, and has a relatively large clear back aperture. In the case of an objective having a semi-angular field of 10° or more, for which the invention is more especially suitable, the ratio of clear back aperture to clear front aperture should be not less than .85, and in general such ratio should be not less than 3.825 tan $\theta$ and not greater than 6.50 tan $\theta$, where $\theta$ is the semi-angular field.

Conveniently each doublet member comprises a convergent element and a divergent element, and in order to obtain good definition the mean refractive indices of the rear divergent element and the front convergent element are preferably not greater than 1.7. The mean refractive index of the rear convergent element is preferably greater than 1.64. Conveniently the convergent element is in front of the divergent element in the front member and behind the divergent element in the rear member.

Preferably the two elements of the front doublet member are cemented together and have mean refractive indices differing from one another by not less than .06. The two elements of the rear doublet member are preferably separated by a negative air lens that is a meniscus-shaped air space thicker at the axis than at the margin, the difference between the curvature of the bounding surfaces of such air lens lying between .10 and .70 of the equivalent power of the whole objective. It is to be understood that the term "power" is herein used to refer to the optical power, that is the reciprocal of the focal length.

The axial thickness of the front element of the rear doublet member conveniently lies between .004 and .020 of the equivalent focal length of the whole objective, and that of the rear element thereof conveniently lies between .01 and .04 of such equivalent focal length.

A convenient practical example of objective according to the invention is illustrated in the accompanying drawing and numerical data therefor are given in the following table, wherein $R_1 R_2 \ldots$ represent the radii of curvature of the various lens surfaces counting from the front (the positive sign indicating that the surface is convex to the front and the negative that it is concave thereto). $D_1 D_2 \ldots$ represent the axial thicknesses of the individual lens elements, and $S_1 S_2$ represent the axial air gaps between the components. The table also gives the mean refractive indices for the D-line and also the Abbé V numbers of the glasses used for the lens elements.

Equivalent focal length 1.000   Relative aperture F/6.3

| Radius | Thickness or air separation | Refractive index $n_D$ | Abbé V number |
|---|---|---|---|
| $R_1 = +.1910$ | | | |
| | $D_1 = .041$ | 1.613 | 55.7 |
| $R_2 = -.5240$ | | | |
| | $D_2 = .010$ | 1.676 | 32.3 |
| $R_3 = +.4620$ | | | |
| | $S_1 = .235$ | | |
| $R_4 = -.1105$ | | | |
| | $D_3 = .014$ | 1.613 | 55.7 |
| $R_5 = -.2230$ | | | |
| | $S_2 = .001$ | | |
| $R_6 = -.2125$ | | | |
| | $D_4 = .027$ | 1.652 | 33.5 |
| $R_7 = -.1610$ | | | |

In this example the ratio between clear back aperture and clear front aperture is 1.20, and a considerable improvement in vignetting is obtained, in comparison with known telephoto objectives, without materially disturbing the correction for coma. The two doublet members are separately achromatised, and the other aberrations are well corrected.

The difference between the curvatures of the bounding surfaces $R_5 R_6$ of the negative air lens in the rear member is .22 of the equivalent power of the whole objective. The index difference across the cemented surface of the front member is .063.

What I claim as my invention and desire to secure by Letters Patent.

1. A telephoto objective corrected for spherical and chromatic aberrations, coma, astigmatism and field curvature, and comprising a rear divergent doublet member consisting of two elements separated by a meniscus-shaped air space whose surfaces are concave to the front the rear surface of such air space having a curvature exceeding that of the front surface thereof by an amount lying between .10 and .70 times the equivalent power of the whole objective, and a front convergent doublet member separated from the rear member by an air space between .15 and .35 times the equivalent focal length of the objective, the mean refractive indices of the four elements of the objective all being greater than 1.610, the objective having a clear back aperture bearing to the clear front aperture a ratio not less than 3.825 tan and not greater than 6.50 tan $\theta$ where $\theta$ is the semi-angular field of the objective.

2. A telephoto objective as claimed in claim 1, in which each doublet member comprises a convergent element and a divergent element, the mean refractive indices of the rear divergent element and of the front convergent element being not greater than 1.7.

3. A telephoto objective as claimed in claim 1, in which the axial thickness of the front element of the rear doublet member lies between .004 and .020 of the equivalent focal length of the whole objective.

4. A telephoto objective as claimed in claim 1, in which the axial thickness of the rear element of the rear doublet member lies between .01 and .04 of the equivalent focal length of the whole objective.

5. A telephoto objective corrected for spherical and chromatic aberrations, coma, astigmatism and field curvature, and comprising a front convergent member having a convergent element in front of a divergent element, and a rear divergent member separated from the front member by an air space between .15 and .35 of the equivalent focal length of the objective and having a divergent element located in front of a convergent element and separated therefrom by a meniscus-shaped air space whose surfaces are concave to the front, the curvature of the front surface of the rear convergent element exceeding that of the rear surface of the adjacent divergent element by an amount lying between .10 and .70 times the equivalent power of the whole objective and having a divergent element in front of a convergent element, the mean refractive indices of the glasses used for the front convergent element and the rear divergent element lying between 1.61 and 1.7, whilst those for the rear convergent element and for the front divergent element are respectively greater than 1.64 and 1.61, the objective having a clear back aperture bearing to the clear front aperture a ratio not less than 3.825 tan $\theta$ and not greater than 6.50 tan $\theta$, where $\theta$ is the semi-angular field of the objective, the two elements of the rear doublet member being separated by a negative air lens, the difference between the curvature of the bounding surfaces of such air lens lying between .10 and .70 of the whole objective of the equivalent power.

6. A telephoto objective as claimed in claim 5, in which the two elements of the front doublet member are cemented together and have mean refractive indices differing from one another by not less than .06.

7. A telephoto objective as claimed in claim 5, in which the axial thickness of the front element of the rear member lies between .004 and .020 of the equivalent focal length of the objective, whilst that of the rear element of the rear member lies between .01 and .04 of such equivalent focal length.

8. A telephoto objective corrected for spherical and chromatic aberrations, coma, astigmatism and field curvature, and comprising a rear divergent member consisting of two elements separated by a negative air lens the two surfaces of which have curvatures differing from one another by an amount lying between .10 and .70 times the equivalent power of the whole objective, and a front convergent doublet member separated from the rear member by an air space between .15 and .35 of the equivalent focal length of the objective, the mean refractive indices of the four glass elements all being greater than 1.610, the objective having a clear back aperture bearing to the clear front aperture a ratio not less than 3.825 tan $\theta$ and not greater than 6.50 tan $\theta$, where $\theta$ is the semi-angular field of the objective, the two elements of the front doublet member being cemented together and having mean refractive indices differing from one another by not less than .06.

9. A telephoto objective having numerical data substantially as set forth in the following table where $R_1 R_2 \ldots$ represent the radii of curvature of the surfaces, $D_1, D_2 \ldots$ represent the axial thicknesses of the elements and $S_1 S_2$ represent the axial air separations:—

Equivalent focal length 1.000  Relative aperture F/6.3

| Radius | Thickness or air separation | Refractive index $n_D$ | Abbé V number |
|---|---|---|---|
| $R_1 = +.1910$ | $D_1 = .041$ | 1.613 | 55.7 |
| $R_2 = -.5240$ | $D_2 = .010$ | 1.676 | 32.3 |
| $R_3 = +.4620$ | $S_1 = .235$ | | |
| $R_4 = -.1105$ | $D_3 = .014$ | 1.613 | 55.7 |
| $R_5 = -.2230$ | $S_2 = .001$ | | |
| $R_6 = -.2125$ | $D_4 = .027$ | 1.652 | 33.5 |
| $R_7 = -.1610$ | | | |

ARTHUR COX.